(12) United States Patent
Fontana, Jr. et al.

(10) Patent No.: US 9,697,943 B2
(45) Date of Patent: *Jul. 4, 2017

(54) LAMINATING MAGNETIC CORES FOR ON-CHIP MAGNETIC DEVICES

(71) Applicant: International Business Machines Corporation, Armonk, NY (US)

(72) Inventors: Robert E. Fontana, Jr., San Jose, CA (US); William J. Gallagher, Arsdely, NY (US); Philipp Herget, San Jose, CA (US); Eugene J. O'Sullivan, Nyack, NY (US); Lubomyr T. Romankiw, Briarcliff Manor, NY (US); Naigang Wang, Ossining, NY (US); Bucknell C. Webb, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,015

(22) Filed: Nov. 10, 2016

(65) Prior Publication Data

US 2017/0062111 A1  Mar. 2, 2017

Related U.S. Application Data

(63) Continuation of application No. 15/149,727, filed on May 9, 2016, now Pat. No. 9,564,165, which is a continuation of application No. 13/760,154, filed on Feb. 6, 2013, now Pat. No. 9,495,989.

(51) Int. Cl.
| | | |
|---|---|---|
| *B32B 15/00* | (2006.01) |
| *H01F 10/32* | (2006.01) |
| *H01F 3/02* | (2006.01) |
| *H01F 41/02* | (2006.01) |
| *C25D 9/08* | (2006.01) |
| *C25D 7/00* | (2006.01) |
| *C25D 7/12* | (2006.01) |
| *C25D 17/00* | (2006.01) |

(52) U.S. Cl.
CPC ......... *H01F 10/3231* (2013.01); *C25D 7/001* (2013.01); *C25D 7/123* (2013.01); *C25D 9/08* (2013.01); *C25D 17/001* (2013.01); *H01F 3/02* (2013.01); *H01F 10/3254* (2013.01); *H01F 41/02* (2013.01); *H01F 10/325* (2013.01); *H01F 10/3236* (2013.01)

(58) Field of Classification Search
None
See application file for complete search history.

(56) References Cited

U.S. PATENT DOCUMENTS

5,795,663 A   8/1998  Koike et al.
7,538,402 B2  5/2009  Fukumoto

*Primary Examiner* — Holly Rickman
*Assistant Examiner* — Linda Chau
(74) *Attorney, Agent, or Firm* — Cantor Colburn LLP; Vazken Alexanian (57) ABSTRACT

A laminating structure includes a first magnetic layer, a second magnetic layer, a first spacer disposed between the first and second magnetic layers and a second spacer disposed on the second magnetic layer.

1 Claim, 7 Drawing Sheets

LAMINATING MAGNETIC CORES FOR ON-CHIP MAGNETIC DEVICES

DOMESTIC PRIORITY

This application is a continuation of U.S. patent application Ser. No. 15/149,727 filed on May 9, 2016, which is a continuation of U.S. patent application Ser. No. 13/760,154, filed on Feb. 6, 2013, the disclosures of which are incorporated by reference herein in its entireties.

BACKGROUND

The present invention relates to on-chip magnetic devices, and more specifically, to systems and methods for laminating magnetic cores for on-chip magnetic devices such as inductors and transformers.

On-chip magnetic inductors/transformers are important passive elements with applications in the fields such as on-chip power converters and radio frequency (RF) integrated circuits. In order to achieve high energy density, magnetic core materials with thickness ranging several 100 nm to a few microns are often implemented. Ferrite materials that often used in bulk inductors have to be processed at high temperature (>800° C.), which is incompatible with complementary metal-oxide-semiconductor (CMOS) processing. Thus, a majority of magnetic materials integrated on-chip are magnetic metals such as nickel iron (Ni—Fe), cobalt iron (Co—Fe), cobalt zirconium titanium (Co—Zr—Ti) and the like. Magnetic metals can be deposited through vacuum deposition technologies (i.e., sputtering) or electrodepositing through an aqueous solution. Vacuum methods have the ability to deposit a large variety of magnetic materials and to easily produce laminated structures. However, they usually have low deposition rates, poor conformal coverage, and the derived magnetic films are difficult to pattern. Electroplating has been a standard technique for the deposition of thick metal films due to its high deposition rate, conformal coverage and low cost.

SUMMARY

Exemplary embodiments include a laminating structure including a first magnetic layer, a second magnetic layer, a first spacer disposed between the first and second magnetic layers and a second spacer disposed on the second magnetic layer.

Additional exemplary embodiments include a multi-layer laminating structure including a first magnetic unit layer, a second magnetic unit layer and a spacer disposed between the first and second magnetic unit layers.

Further exemplary embodiments include a method of fabricating a lamination structure, the method including depositing a seed layer on a substrate, patterning a photoresist layer on the seed layer, forming a lamination structure unit within the photoresist layer and removing the photoresist layer and a portion of the seed layer surrounding the lamination structure.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein implement multiple spacer layers to laminate magnetic cores for on-chip magnetic devices such as inductors and transformers. Compared to ferrite materials, magnetic metals usually have high permeability and high magnetic flux density which is necessary to achieve high energy density for on-chip devices. However, the resistivity of magnetic metals are usually low (<100 μΩ·cm). Since most of the on-chip devices are operated at high frequencies (>10 MHz), large eddy currents can be induced within the respective magnetic core. The consequence is that the high frequency permeability is dramatically reduced and the loss is very high so that the inductors will not function properly at high frequencies. Conventionally, eddy current is reduced by laminating the magnetic core by insulators so that the eddy current only flows within each magnetic layer. As the thickness of each layer is made thinner, the effective resistance within layers becomes larger; hence reducing the eddy. However, it is difficult to electroplate a good insulator, which limits the electroplating techniques in magnetic core fabrication. Relatively high resistive materials, such as semiconductor materials, can be plated with resistivities arranging from (100 μΩ·cm to 10000 μΩ·cm). But these relatively high resistive layers have to be thick in order to prevent the eddy current flowing between magnetic layers. Depending on the resistivity of the materials, the thickness of these high resistive materials has to be larger than 100 nm up to a few microns.

Figure 1A:
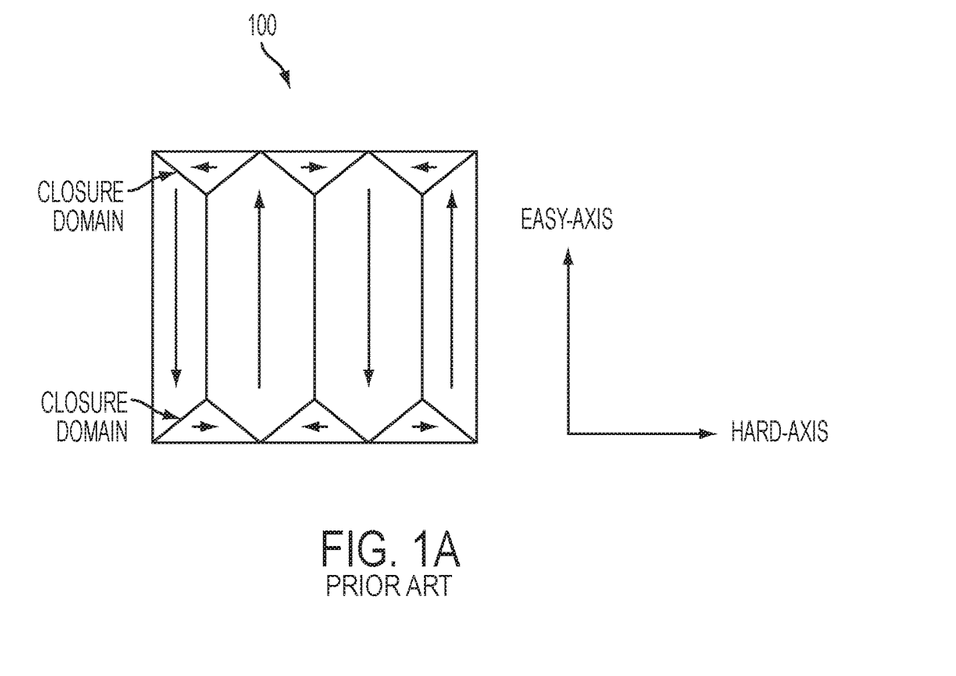
FIG. 1A illustrates a schematic diagram example of magnetic patterns for an on-chip conductor.

Another important property for on-chip magnetic core is magnetic domains. FIG. 1A illustrates a schematic diagram 100 of an example of magnetic patterns for an on-chip conductor. For on-chip planer inductors, magnetic anisotropy (i.e. easy and hard axis) needs to be well defined. In a demagnetized state, the magnetic domain forms a flux-closed configuration at the edges of the pattern (i.e., a closure domain) as shown in FIG. 1A. At relatively low frequencies, the flux propagation (i.e., along the hard axis) is governed by both the magnetization rotation and domain wall movement. Instead of the hysteresis loss, the domain wall movements can also induce local eddy current which will add to the total loss. At higher frequencies (>100 MHz), only the magnetization rotation contributes to the permeability because domain wall movement is too slow to move. The inactive fraction parallel to the hard axis within the closure domains will not respond to the fast magnetic field changes. As such, the high frequency permeability is reduced. Therefore, reducing or eliminating closure domains has the potential to reduce the loss and achieve high frequency permeability, benefitting on-chip inductors. Closure domains can be eliminated also by laminating the magnetic materials with a spacer. However, the requirements for the spacers vary. Compared to the spacers for eddy-current control, the spacer for magnetic coupling has to be non-magnetic and thin (5-20 nm). However, the spacer can be either conductive or resistive.

Conventional electroplating does not provide a thin insulator to fulfill both requirements for the control of both eddy current and closure domains. Alternately, plating magnetic films in aqueous solution and then sputtering insulators in a vacuum can be expensive and time consuming. As such, conventional methods typically focus on one type of spacer in a magnetic core for one of the aforementioned purposes, that is, either to control eddy current or to remove closure domains. In exemplary embodiments, the systems and methods described herein implement a lamination structure that can both control eddy current and remove closure domains, using two types of spacers in one magnetic core. All the layers (magnetic and spacers) can be electroplated, which improves the high frequency performance of the on-chip inductors.

In exemplary embodiments, the systems and methods described herein implement two different types of spacer layers to laminate one single core. One type is thin and non-magnetic (can be metal e.g., copper (Cu)) used to remove closure domain and domain walls. The other type is thick and high resistive (can be semiconductor e.g., selenium (Se) or a Se alloy) used to reduce the eddy current. By implemented the exemplary lamination method, both the domain and eddy current can be controlled so that the result inductors have better performance. In addition, the whole structure can be electroplated through aqueous solutions as described further herein.

Figure 1B:
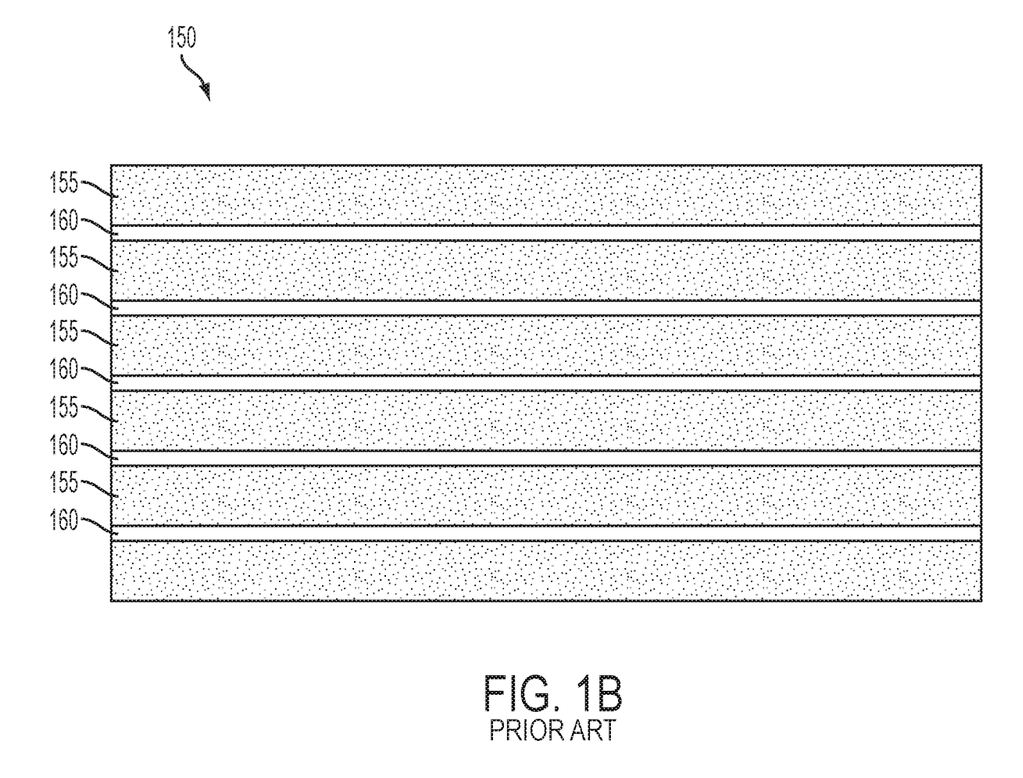
FIG. 1B illustrates a conventional laminating structure that can be modified in accordance with exemplary embodiments.

FIG. 1B illustrates a conventional laminating structure 150 that can be modified in accordance with exemplary embodiments. The conventional laminating structure 150 includes alternating magnetic layers 155 and thinner electroplated spacer layers 160 (<20 nm) to control magnetic domains and which can be conductive. The spacer layers 160 can be metals such as nickel phosphorous (NiP) or Cu. Each of the electroplated spacer layers 160 are fabricated relatively thin to ensure the magnetostatic coupling between the magnetic layers 155 so that the closure domains can be eliminated. However, because of the relatively low resistivity combined with the low thickness of the electroplated spacer layers 160, the resistance of the electroplated spacer layers 160 is too low to control eddy current, which means that the eddy currents can easily flow across the electroplated spacer layers 160, to form a global eddy current across the whole structure 150. In exemplary embodiments, the systems and methods described herein improve the structure 150 so that both the closure magnetic domains and eddy currents can be reduced. As described further herein, both the closure magnetic domains and eddy currents can be reduced by introducing two different types of spacer layers.

Figure 2:
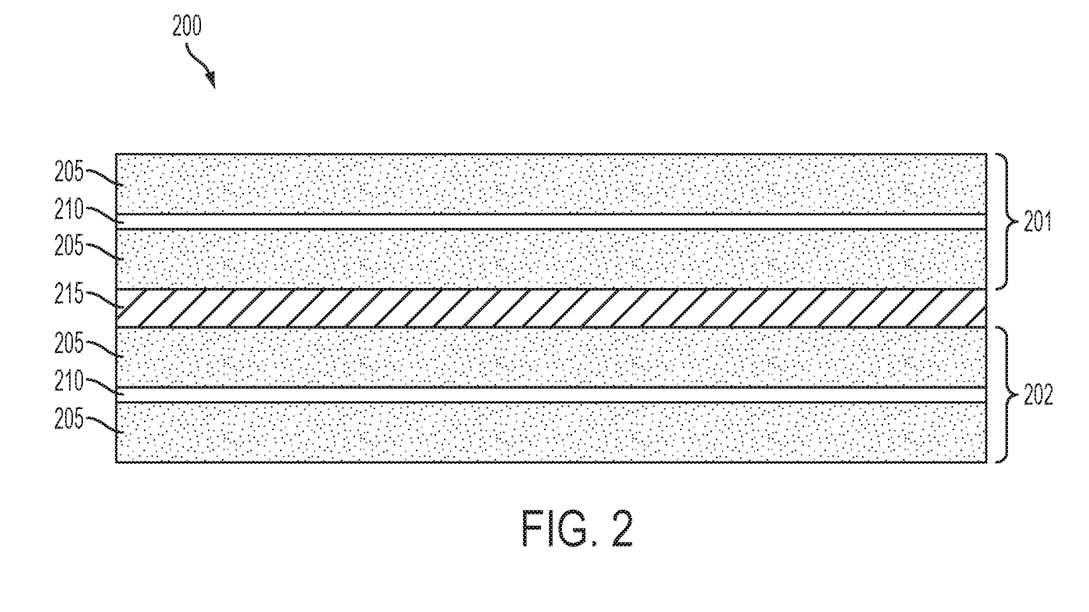
FIG. 2 illustrates an exemplary laminating structure.

FIG. 2 illustrates an exemplary laminating structure 200. The laminating structure includes magnetic layers 205 with a thin spacer layer 210 disposed between the magnetic layers 205 to form individual units, shown in FIG. 2A as units 201, 202. A spacer layer 215 is disposed between the units 201, 202. The material spacer layer 215 is thicker relative to the spacer layers 210. As described herein, the spacer layers 210 are thin (<300 angstroms (Å)) relative to the spacer layer 215, and control the magnetic domains. The spacer layers 210 can be conductive. The spacer layer 210 can be about 5-30 nm thick and can be materials including but not limited to copper (Cu), molybdenum (Mo), zinc (Zn), rubidium (Ru), gold (Au), silver (Ag), selenium (Se), tellurium (Te), sulfur (S), phosphorous (P), gallium (Ga), chromium (Cr), rhenium (Re), indium (In), tin (Sn), nickel phosphorous (NiP), and nickel boron (NiB) and their non magnetic alloys that can be electrochemically reduced. The spacer layer 215 controls the eddy current and can be a high resistive material. The spacer layer 215 is about 100 nm up to 1 μm, and can be materials including but not limited to semiconductor metals such as Se, bismuth (Bi), Te, P, S, germanium (Ge), antimony (Sb), Si and their alloys that can be electrochemically reduced.

In exemplary embodiments, the total thickness of the units is within a skin depth of the conductor. The skin depth is defined as the depth below the surface of the conductor at which the current density has fallen to 1/e (about 0.37) of surface current density. In a magnetic material, the skin depth can also be treated as the flux density decay to 1/e. When the thickness of the magnetic materials is larger than skin depth, the eddy current will be dramatically increased, and the center of the magnetic material will experience little flux. As such, each magnetic layer 205 is below skin depth for the structure 200. Different magnetic materials have different skin depths because the skin depth δ relates to the resistivity and permeability of the material, and also the operation frequency as shown in the equation:

$$\delta = \sqrt{\frac{2\rho}{\omega\mu}}$$

In the equation, $\rho$ is the resistivity, $\omega$ is the operating frequency and $\mu$ is the permeability. The skin depth can range from 50 nm up to 1-2 microns.

Figure 3:
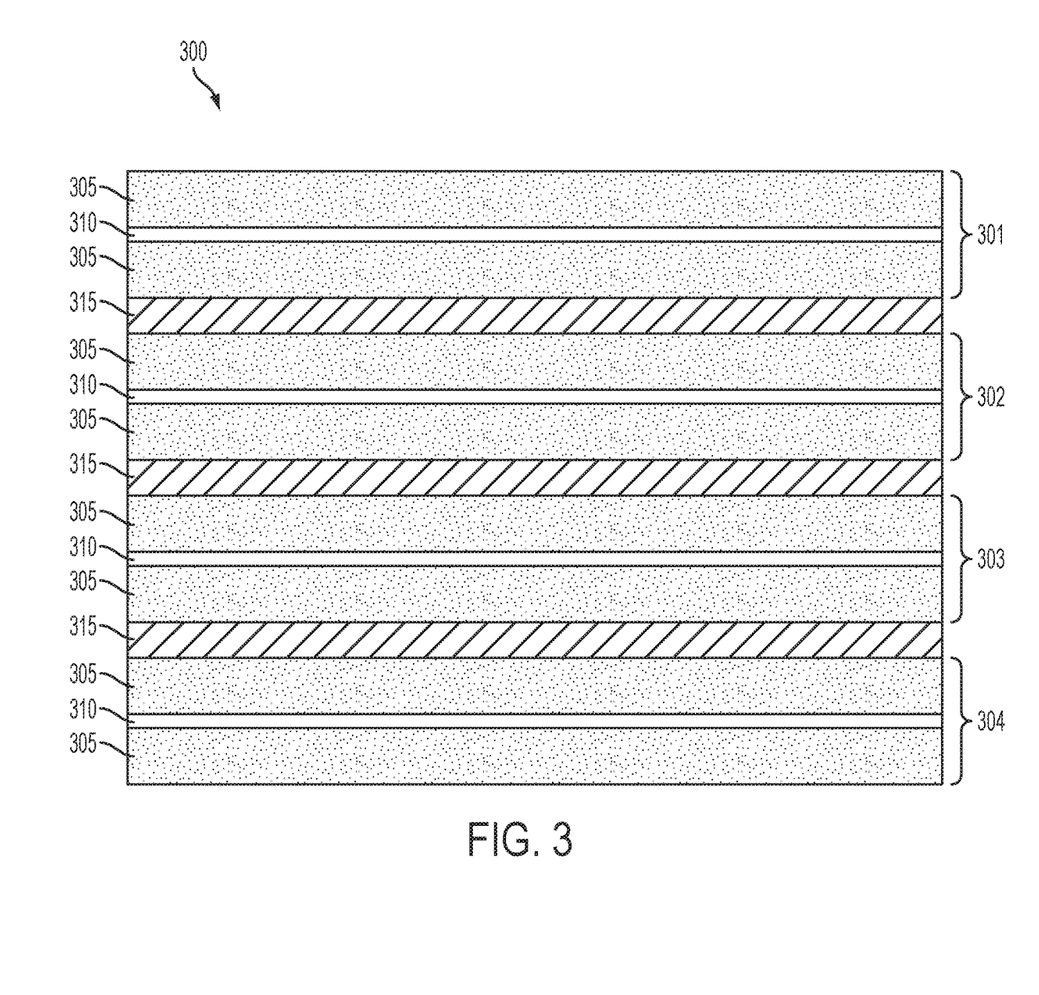
FIG. 3 illustrates an exemplary multilayer laminating structure.

As such, the structure 200 utilizes the thin and non-magnetic spacer layer 210 to separate the magnetic layers 205 in each unit 201, 202. Magneto-static coupling between the magnetic layers 205 through the spacer layers 210 removes the closure domains. In exemplary embodiments, the total thickness of the two magnetic layers 205 plus the non-magnetic spacer layer 210 is less than the skin depth in order to minimize eddy currents. As described herein, the high resistive spacer layer 215 the units 201, 202. This thicker spacer layer 215 controls eddy currents. In exemplary embodiments, multiple additional units can be repeated to form multilayers. FIG. 3 illustrates an exemplary multilayer laminating structure 300. The multilayer laminating structure 300 include several units similar to as described with respect to FIG. 2. Each of the units 310, 302, 303, 304 includes magnetic layers 305 with a thin spacer layer 310 disposed between the magnetic layers 305. Each of the units are separated by the thicker spacer layer 315 as described with respect to FIG. 2

Figure 4:
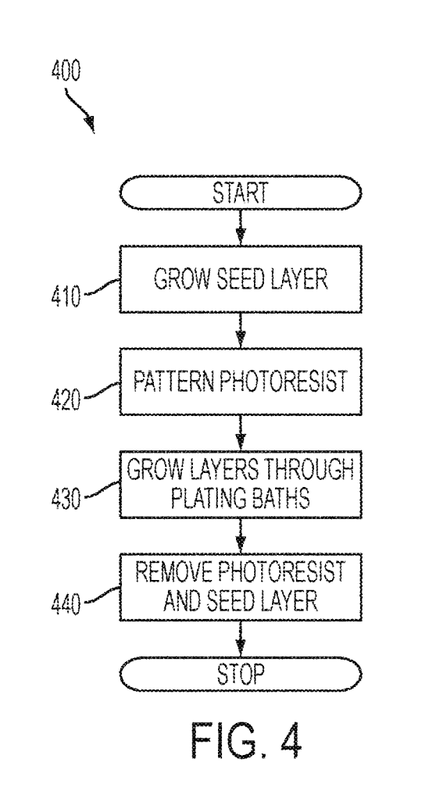
FIG. 4 illustrates a flowchart of a method for fabricating a laminating structure in accordance with exemplary embodiments.
Figure 5A:
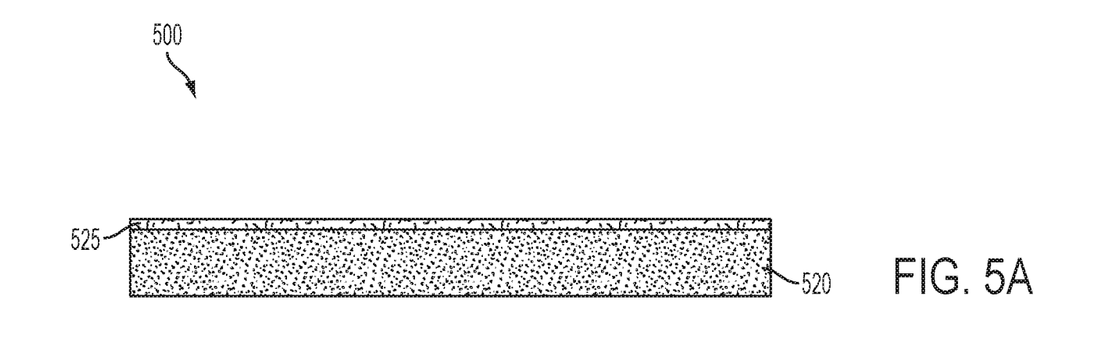
FIG. 5A illustrates a starting structure for an exemplary laminated structure such as illustrated in FIGS. 2 and 3.
Figure 5B:
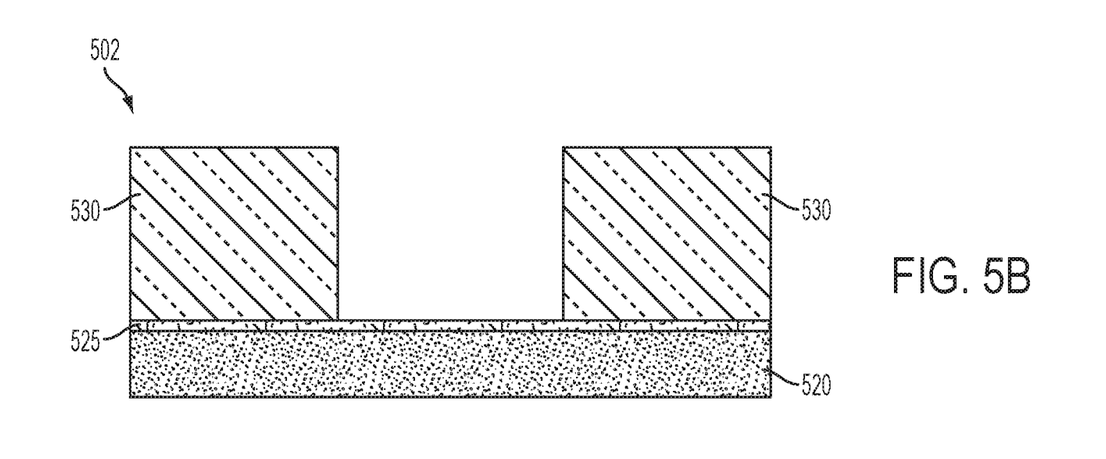
FIG. 5B illustrates an intermediate structure for an exemplary laminated structure such as illustrated in FIGS. 2 and 3.
Figure 5C:
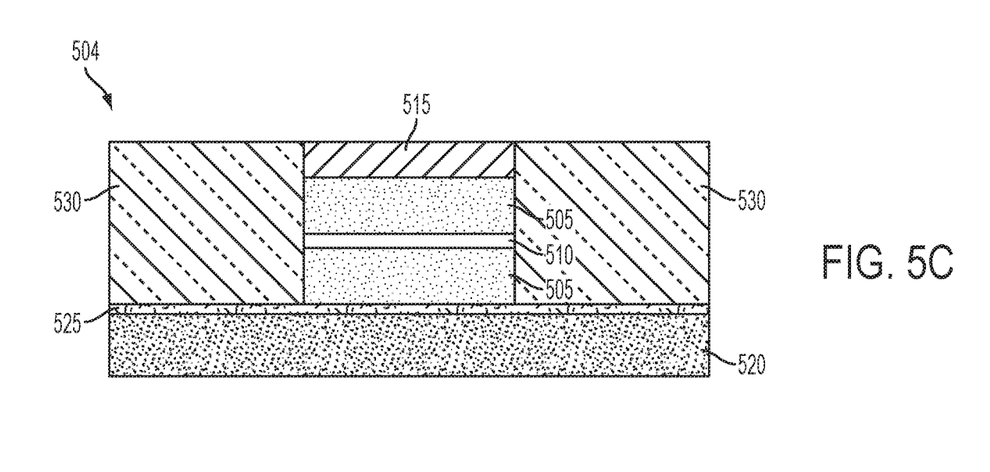
FIG. 5C illustrates an intermediate structure for an exemplary laminated structure such as illustrated in FIGS. 2 and 3.

FIG. 4 illustrates a flowchart of a method 400 for fabricating a laminating structure in accordance with exemplary embodiments. FIG. 5A illustrates a starting structure 500 for an exemplary laminated structure such as described with respect to FIGS. 2 and 3. At block 410, a seed layer 525 is deposited on a substrate 520. The substrate 520 can be any standard semiconductor substrate including, but not limited to, silicon (Si). The seed layer 525 can be any sputtered metal including, but not limited to, Cu and nickel ferrite (Ni—Fe). FIG. 5B illustrates an intermediate structure 502 for an exemplary laminated structure such as described with respect to FIGS. 2 and 3. At block 420, a photoresist layer 530 is patterned on the seed layer 525. The photoresist layer 530 can be any photosensitive patternable polymer. The patterning techniques implemented can also be any conventional photolithography technique. FIG. 5C illustrates an intermediate structure 504 for an exemplary laminated structure such as described with respect to FIGS. 2 and 3. At block 430, each of the magnetic layers 505, spacer layer 510 and thicker spacer layer 515 are grown in the patterned photoresist layer 530. The layers 505, 510, 515 are alternated and grown to thicknesses as described herein with respect to FIGS. 2 and 3. In exemplary embodiments, the plating of multi-layers involve three different plating baths, one for the magnetic layers 505, one for the thin spacer layer 510 and another one for the thick spacer layers 515. In other exemplary embodiments, the thin spacer layer 510 sometimes can plated in the same bath as the magnetic layers 505, (e.g. Ni—Fe/Cu/Ni—Fe as further described herein). In exemplary embodiments, the plating is done by switching the wafer containing the structure 504 among the baths with thorough rinsing in between. In addition, the spacer layers 515 can be electroplated with Se or Se alloys.

The plating bath solutions contain surfactant additives that markedly enhance the low-potential selenium deposition and avoid forming selenium particles at high potential while maintaining a high deposition rate. The presence of the surfactant additives in the plating bath promotes formation of continuous selenium and further enhances the first reaction so that a high deposition rate can still be maintained. In addition, the plating method produces continuous and particle-free selenium and selenium-alloy films.

The Se electroplating bath solution may be prepared by: i) dissolving a desired amount of at least one Se ion source, such as selenous acid (i.e., $H_2SeO_3$; also referred to as selenious acid) or selenium oxide ($SeO_2$) or mixtures thereof in a solvent such as water; ii) adding to the solution at least one soluble surfactant additive; and iii) adjusting the pH of the solution by adding an acid. Exemplary non-limiting acids include sulfuric acid, nitric acid, hydrochloric acid, and the like. The presence of the at least one surfactant additive has been found to promote formation of a continuous selenium coating and further enhance the first reaction so that a high deposition rate can still be maintained.

The total concentration of the Se ions in the bath may vary over a wide range depending on the desired properties. Se metal ions are present in the plating bath in an amount from about 0.001 to about 1 molar (M). In other embodiments, the Se metal ion present in the bath is about 0.01 to about 1 M, and in still other embodiments, the Se metal ion present in the bath is about 0.1 to about 1 M.

The surfactant additive is a lower alkane sulfonic acid or lower alkane phosphonic acid or salt thereof of the general formulae: $RSO_3H$, and $RH_2PO_3$, where R is an alkyl group containing from about 1 to about 25 carbon atoms. In other embodiments, R is an alkyl group containing from about 1 to 18 carbon atoms, and in still other embodiments, R is an alkyl group containing 1 to 12 carbon atoms. The alkyl group may be branched or linear. Suitable surfactant additives of the general formula above are soluble in the selected solvent, e.g., water. Non-limiting alkane sulfonic acid surfactant additives includes, without limitation, propane sulfonic acid, 2-propane sulfonic acid, decanesulfonic acid, undecanesulfonic acid, and the like Non-limiting alkane phosphonic acid surfactant additives includes, without limitation, propylphosphonic acid, butylphosphoinic acid, hexylphosphonic acid, octylphosphonic acid, dodecylphosphonic acid, and the like. The surfactant additive is soluble in the selected solvent, (e.g., water).

In exemplary embodiments, the concentration of the surfactant additive in the plating baths is about 1 milligram to 1 gram per liter. In other embodiments, the concentration of the surfactant additive in the plating baths is about 5 to 750 milligrams per liter, and in still other embodiments, the concentration of the surfactant additive in the plating baths is about 10 to 250 milligrams per liter.

Although water is the preferred solvent in the formulation of the plating baths, it should be appreciated that organic solvents may also be added in the formulation, partially or wholly replacing the water. Such organic solvents include, but are not limited to, alcohols, acetonitrile, propylene carbonate, formamide, dimethyl sulfoxide, glycerin, etc.

Optionally, the electroplating bath may further include other additives typically employed in electroplating baths including, but not limited to, organic aids, brighteners, buffers, chelating species, and the like. Exemplary brighteners are well known and generally include sulfonamides, sulfonimdies, benzene sulfonic acids, napthalenesulfonic acids, and the like. Exemplary chelating species include ethylenediamine tetraacetic acid (EDTA), ethylenediaminetetra-2-hydroxypropoane (quadrol), malic acid, citric acid, mannitol, sorbitol, and the like.

The pH of the selenium electroplating solution in accordance with the present disclosure may be adjusted to the range of about 2 to about 4. In still other embodiments, the pH is adjusted to about 3 to about 4.

The electroplating bath operating temperature can generally range from about 15° C. to about 45° C. In some embodiments, the electroplating bath operating temperature is at about 18 to about 25° C. In still other embodiments, electroplating bath operating temperature is at about room temperature, e.g., about 20 to about 22° C.

Plating current densities are typically on the order of about 0.5 to about 20 $mA/cm^2$ and deposition times may vary from about 30 minutes to several hours or more. In other embodiments, the current densities are about 1 to about 10 $mA/cm^2$ and in still other embodiments, the current densities are about 1 to about 5 $mA/cm^2$. Although DC voltage/current can be utilized during the electrodeposition processes, it should be noted that pulsed or other variable voltage/current sources may also be used to obtain high plating efficiencies and high quality deposits. If a pulsed current is used, the current density will generally be higher, e.g., about double the current density in the steady state.

A number of sequential electroplating and annealing steps may be utilized to obtain the desired thickness of the spacer layers 510, 515 on the structure 504. In addition, the electroplating process and Se electroplating solutions described herein can be used to form Se alloy films.

As described herein, the structure 504 is placed directly into a plating bath solution prepared as described herein. The electroplating solution can include a Se source and one or more surfactant additives selected from the group consisting of alkane sulfonic acids, alkane phosphonic acid, salts thereof, and mixtures thereof. In addition to the Se source and the surfactant additive, the electroplating solution may further contain one or more metal salts. The particular metal salt(s) used depends on the desired composition of the layers

510, 515. By way of example only, the electroplating solution can include a Cu salt, a Ga salt, a combination of a Cu salt, a Zn salt and a Sn salt and the like. Suitable Cu, In, Ga, Zn and Sn salts are described herein. Electroplating is then used to form the spacer layers 510, 515 as described herein. The plating time can be tailored to the desired thickness of the resultant absorber layer, with a longer plating time being used to attain a thicker layer. According to an exemplary embodiment, the spacer layers 510, 515 are formed on the substrate to a thickness of from about 1 nm to about 1 micrometer (m).

Alternatively, the Se layer can be directly plated onto Cu, In or Ga containing surfaces to form precursor stacks having various configurations. Such configurations include, but are not limited to Cu/In/Se, Cu/In/Ga/Se, Cu—Ga/In/Se, and the like. In a two-stage process, controlled amounts of Cu, In, Ga and Se are electrodeposited in the form of Cu, In, Ga and Se containing thin film precursor stacks such as Cu/In/Ga/Se, Cu/Ga/In/Se, In/Cu/Ga/Se, Ga/Cu/In/Se, In/Ga/Cu/Ga/Se, In/Ga/Cu/In/Se, Ga/In/Cu/Ga/Se, Ga/In/Cu/In/Se, Cu/Ga/Cu/In/Se, Cu/In/Cu/Ga/Se or the like. These stacks may then be annealed, or reacted, optionally with more Se, sulfur (S), tellurium (Te) or sodium (Na), to form a uniform thin film of a Se alloy or compound on the contact layer. By controlling the thickness and morphology of the Cu, In, and Ga as well as Se layers within the precursor stacks, the process yield in terms of compositional control may be improved compared to the prior-art methods.

Figure 5D:
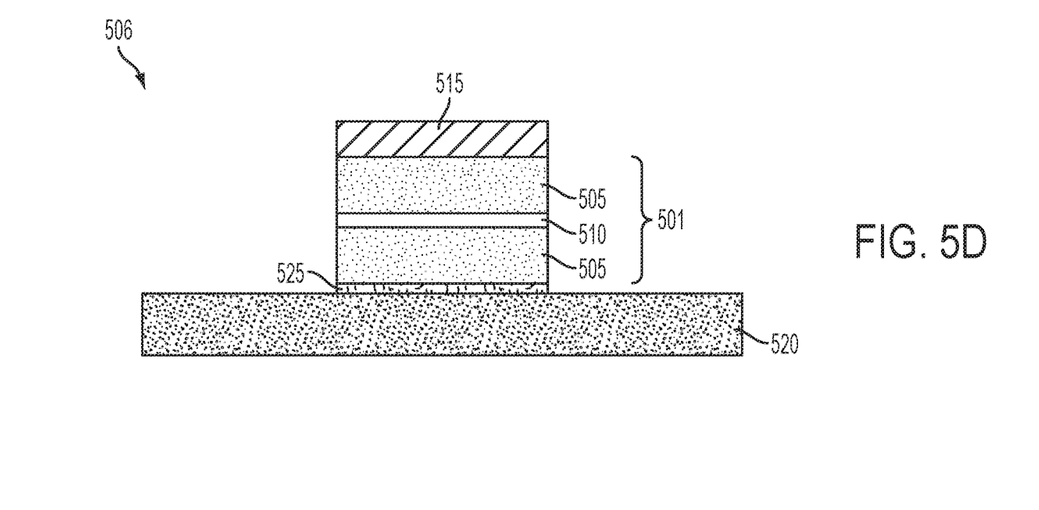
FIG. 5D illustrates a final structure for an exemplary laminated structure such as illustrated in FIGS. 2 and 3.

FIG. 5D illustrates a final structure 506 for an exemplary laminated structure such as described with respect to FIGS. 2 and 3. Once the desired electroplating processes as described herein have been performed to form the layers 505, 510, 515, the photoresist layer 530 is removed by standard resist removal techniques. In addition, the seed layer 525 is removed around the unit 501 (i.e., the magnetic layers 505 and spacer layer 510) and spacer layer 515 up to the substrate 520 by standard etching techniques. It is appreciated that the unit 501 and spacer layer 515 are similar to the exemplary laminated structures 200, 300 of FIGS. 2 and 3.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An on-chip magnetic device consisting of:
   a first magnetic unit consisting of first and second magnetic layers and a non-magnetic spacer layer therebetween, wherein the non-magnetic spacer layer has a thickness of 5 to 20 nanometers and is selected from the group consisting of copper, molydenum, zinc, rubidium, gold, silver, selenium, tellurium, sulfur, phosphorous, gallium, chromium, rhenium, indium, tin, nickel phosphorous, nickel boron, and non-magnetic alloys thereof;
   at least one additional magnetic unit consisting of first and second magnetic layers and the non-magnetic spacer layer therebetween;
   a resistive spacer disposed between the first and the at least one additional magnetic units, wherein the resistive spacer is at a thickness of 100 nm to 1 micron and is selected from the group consisting of selenium, bismuth, tellurium, phosphorous, sulfur, germanium, antimony, and alloys thereof that can be electrochemically reduced.

* * * * *